US010575214B2

United States Patent
Kimura et al.

(10) Patent No.: US 10,575,214 B2
(45) Date of Patent: *Feb. 25, 2020

(54) COMMUNICATION APPARATUS, COMMUNICATION METHOD, AND COMMUNICATION SYSTEM FOR HANDLING FRAMES OF VARIABLE LENGTH

(71) Applicant: SONY CORPORATION, Tokyo (JP)

(72) Inventors: Ryota Kimura, Tokyo (JP); Hiroaki Takano, Saitama (JP); Yuichi Morioka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,261

(22) Filed: Sep. 21, 2018

(65) Prior Publication Data
US 2019/0037440 A1    Jan. 31, 2019

Related U.S. Application Data

(63) Continuation of application No. 15/642,627, filed on Jul. 6, 2017, now Pat. No. 10,111,134, which is a
(Continued)

(30) Foreign Application Priority Data

May 8, 2009    (JP) .................. 2009-113868

(51) Int. Cl.
*H04W 28/06*    (2009.01)
*H04J 99/00*    (2009.01)
(Continued)

(52) U.S. Cl.
CPC ............. *H04W 28/06* (2013.01); *H04J 15/00* (2013.01); *H04L 1/0006* (2013.01);
(Continued)

(58) Field of Classification Search
None
See application file for complete search history.

(56) References Cited

U.S. PATENT DOCUMENTS

| 7,570,695 B2 | 8/2009 | Maltsev et al. |
| 8,418,036 B2 | 4/2013 | Yuan et al. |

(Continued)

FOREIGN PATENT DOCUMENTS

| CA | 2513343 A1 | 12/2004 |
| CA | 2513345 A1 | 12/2004 |

(Continued)

OTHER PUBLICATIONS

Mar. 31, 2016, KR communication issued for related KR application No. 10-2011-7025963.

(Continued)

*Primary Examiner* — Brian S Roberts
(74) *Attorney, Agent, or Firm* — Paratus Law Group, PLLC

(57) ABSTRACT

Frames in a variable length frame format which are addressed to a plurality of users are multiplexed and preferably transmitted. Data frames having different lengths are multiplexed on a same time through space division multiple access, but since the multiplexed frames are transmitted while eventually having a same length, when the multiplexed data frames from the access point STA0 are received in the respective communication stations STA1 to STA3 in FIG. 4 or when data simultaneously transmitted from the respective communication stations STA1 to STA3 are received in the access point STA0 in FIG. 5, it is possible to eliminate an operation instability of AGC.

23 Claims, 10 Drawing Sheets

Related U.S. Application Data continuation of application No. 14/695,230, filed on Apr. 24, 2015, now Pat. No. 9,706,436, which is a continuation of application No. 13/318,326, filed as application No. PCT/JP2010/056919 on Apr. 19, 2010, now Pat. No. 9,036,610.

(51) Int. Cl.
  *H04L 1/00* (2006.01)
  *H04B 7/06* (2006.01)
  *H04B 7/08* (2006.01)

(52) U.S. Cl.
  CPC .......... *H04B 7/0617* (2013.01); *H04B 7/0697* (2013.01); *H04B 7/086* (2013.01)

(56) References Cited

U.S. PATENT DOCUMENTS

| | | | |
|---|---|---|---|
| 9,706,436 | B2 | 7/2017 | Kimura et al. |
| 10,111,134 | B2 * | 10/2018 | Kimura ................ H04L 1/0006 |
| 2003/0091098 | A1 | 5/2003 | Manninen et al. |
| 2003/0174677 | A1 | 9/2003 | Mantha |
| 2005/0180353 | A1 | 8/2005 | Hansen et al. |
| 2005/0233710 | A1 | 10/2005 | Lakkis et al. |
| 2006/0087998 | A1 | 4/2006 | Saito et al. |
| 2006/0139201 | A1 | 6/2006 | Nagata et al. |
| 2006/0146757 | A1 | 7/2006 | Harris |
| 2006/0171353 | A1 | 8/2006 | Nagata et al. |
| 2006/0182017 | A1 | 8/2006 | Hansen et al. |
| 2006/0209874 | A1 | 9/2006 | Nagata |
| 2007/0276984 | A1 | 11/2007 | Schuessler |
| 2008/0098273 | A1 | 4/2008 | Blankenship et al. |
| 2010/0046656 | A1 | 2/2010 | van Nee et al. |
| 2010/0248635 | A1 | 9/2010 | Zhang et al. |

FOREIGN PATENT DOCUMENTS

| | | | |
|---|---|---|---|
| CA | 2515537 | A1 | 12/2004 |
| CA | 2518590 | A1 | 12/2004 |
| CN | 1751480 | A | 3/2006 |
| CN | 1759576 | A | 4/2006 |
| CN | 1774892 | A | 5/2006 |
| CN | 101425831 | A | 5/2009 |
| CN | 101425881 | A | 5/2009 |
| CN | 101425886 | A | 5/2009 |
| CN | 101478378 | A | 7/2009 |
| CN | 101478382 | A | 7/2009 |
| EP | 1635492 | A1 | 3/2006 |
| EP | 1635516 | A1 | 3/2006 |
| EP | 1635517 | A1 | 3/2006 |
| EP | 1635518 | A1 | 3/2006 |
| EP | 1667480 | A1 | 6/2006 |
| JP | 2855172 | B2 | 2/1999 |
| JP | 2001-148646 | A | 5/2001 |
| JP | 2001-308929 | A | 11/2001 |
| JP | 2004-328570 | A | 11/2004 |
| JP | 2006-287931 | A | 10/2006 |
| JP | 2007-089113 | A | 4/2007 |
| JP | 3917638 | B2 | 5/2007 |
| JP | 2007-208522 | A | 8/2007 |
| JP | 4045286 | B2 | 2/2008 |
| JP | 2008-148358 | A | 6/2008 |
| JP | 4126058 | B2 | 7/2008 |
| JP | 4126059 | B2 | 7/2008 |
| JP | 2008-193707 | A | 8/2008 |
| JP | 2008-236065 | A | 10/2008 |
| JP | 2009-506679 | A | 2/2009 |
| KR | 10-2005-0098933 | A | 10/2005 |
| KR | 10-2005-0106113 | A | 11/2005 |
| KR | 10-2006-0016743 | A | 2/2006 |
| KR | 10-2006-0016751 | A | 2/2006 |
| KR | 10-2006-0096450 | A | 9/2006 |
| WO | WO 02/41647 | A2 | 5/2002 |
| WO | WO 2004/114561 | A1 | 12/2004 |
| WO | WO 2004/114608 | A1 | 12/2004 |
| WO | WO 2004/114609 | A1 | 12/2004 |
| WO | WO 2004/114610 | A1 | 12/2004 |
| WO | WO 2005/027555 | A1 | 3/2005 |
| WO | WO 2008/058109 | A2 | 5/2008 |
| WO | WO 2008/137596 | A1 | 11/2008 |
| WO | WO 2010/117816 | A1 | 10/2010 |

OTHER PUBLICATIONS

Nov. 30, 2015, European Search Report issued for related EP Application No. 10772143.3.
Jan. 2, 2017, KR Communication issued for related KR application No. 10-2011-7025963.
Oct. 28, 2016, KR communication issued for related KR application No. 10-2011-7025963.
Nov. 11, 2014, Japanese Office Action issued for related JP application No. 2014-034618.
Oct. 8, 2013, Chinese Office Action issued for related CN application No. 201080019374.8.
Jul. 23, 2013, JP communication issued for related JP application No. 2009-113868.
English-language International Search Report from the Japanese Patent Office for PCT/JP2010/056919 dated Jul. 6, 2010.
Nov. 15, 2017, European Search Report issued for related EP Application No. 17189646.7.
Jan. 17, 2018, Chinese Office Action issued for related CN Application No. 201510502176.1.
Jun. 4, 2019, European Search Report issued for related EP Application No. 19156039.0.

* cited by examiner

↑ : DATA SUB-CARRIER     ↑ (dashed) : PADDED SUB-CARRIER

■ : PADDING POSITION

COMMUNICATION APPARATUS, COMMUNICATION METHOD, AND COMMUNICATION SYSTEM FOR HANDLING FRAMES OF VARIABLE LENGTH

CROSS-REFERENCE TO PRIOR APPLICATION

This application is a continuation of U.S. patent application Ser. No. 15/642,627 (filed on Jul. 6, 2017), which is a continuation of U.S. patent application Ser. No. 14/695,230 (filed on Apr. 24, 2015 and issued as U.S. Pat. No. 9,706,436 on Jul. 11, 2017), which is a continuation of U.S. patent application Ser. No. 13/318,326 (filed on Oct. 31, 2011 and issued as U.S. Pat. No. 9,036,610 on May 19, 2015), which is a National Stage Patent Application of PCT International Patent Application No. PCT/JP2010/056919 (filed on Apr. 19, 2010) under 35 U.S.C. § 371, which claims priority to Japanese Patent Application No. 2009-113868 (filed on May 8, 2009), which are all hereby incorporated by reference in their entirety.

TECHNICAL FIELD

The present invention relates to a communication apparatus and a communication method, and a communication system to which a space division multiple access (Space Division Multiple Access: SDMA) where a wireless resource on a spatial axis is shared by a plurality of users is applied and particularly relates to a communication apparatus and a communication method, and a communication system in which frames in a variable length frame format which are addressed to a plurality of users are multiplexed and transmitted.

BACKGROUND ART

A wireless communication eliminates burden of wiring operations in a traditional wired communication and further serves for a utilization as a technology for realizing a mobile communication. For example, as a regular standard with regard to a wireless LAN (Local Area Network), IEEE (The Institute of Electrical and Electronics Engineers) 802.11 can be exemplified. IEEE802.11a/g has been already widely spread.

According to the standard of IEEE802.11a/g, in a 2.4 GHz band or 5 GHz band frequency, a modulation method for achieving a communication speed of 54 Mbps at maximum (physical layer data rate) is supported by utilizing an orthogonal frequency division multiplexing (Orthogonal Frequency Division Multiplexing: OFDM). Also, in IEEE802.11n that is an extended standard thereof, a further higher bit rate is realized by adopting an MIMO (Multi-Input Multi-Output) communication system. Herein, the MIMO refers to a communication system provided with a plurality of antenna elements on both a transmitter side and a receiver side for realizing spatially multiplexed streams (widely known). Although a high throughput (High Throughput: HT) above 100 Mbps can be achieved by IEEE802.11n, a realization or a further higher speed is demanded along with an increase in the information amount of transmission contents.

For example, since the number of antennas in the MIMO communication device is increased and the number of streams to be spatially multiplexed is increased, it is possible to improve the throughput in a one-to-one communication while the backward compatibility is maintained. However, in future, an improvement in the throughput for the plurality of users as a whole is demanded in addition to the throughput per user in the communication.

The working group for IEEE802.11ac aims to establish a wireless LAN standard in which a frequency band smaller than or equal to 6 GHz is used and a data transmission speed exceeds 1 Gbps, and for the realization, like multi user MIMO (MU-MIMO) or SDMA (Space Division Multiple Access), a space division multiple access system where a wireless resource on a spatial axis is shared by a plurality of users is potent.

At present, the space division multiple access is under review as one of fundamental technologies for a next generation mobile phone series system based on a time division multiple access (Time Division Multiple Access: TDMA) such as PHS (Personal Handyphone System) or LTE (Long Term Evolution). Also, in a wireless LAN field, a one-to-many communication is being paid attention as described above, but an application example is rarely met. This is probably because it is difficult to efficiently multiplex the plurality of users in the packet communication.

Incidentally, a communication system is proposed in which two technologies or the carrier sense in the conventional IEEE802.11 and the space division multiple access by an adaptive array antenna are combined with each other by using the RTS, CTS, and ACK packets composed of a packet format that maintains a backward compatibility with the conventional IEEE802.11 (for example, see PTL 1).

Herein, in a case where the space division multiple access is applied to the wireless LAN, a case of multiplexing variable length frames on a same time axis is conceivable. No problem occurs if transmission data lengths with respect to each of a plurality of users are all the same sizes, but if frame lengths to be multiplexed vary from each other due to a difference in the transmission data lengths, the total transmission power abruptly changes along with an increase or decrease in the number of the multiplexed frames daring a transmission period. If the frames having the different lengths are multiplexed and transmitted without change, the reception power abruptly changes along with the increase or decrease in the number of multiplexed frames on the reception side, which triggers an instable operation in terms of an auto gain control (Auto Gain Control: AGC), and also, a possibility exists in that problems occur from various viewpoints such as an instability of power distribution within the frame with regard to RCPI (Received Channel Power Indicator) regulated by IEEE802.11. For this reason, even if the transmission data length for each user varies, the frames multiplexed on the same time need to be transmitted while eventually having the same frame length.

For example, in a system of a fixed frame format such as a conventional cellular system, it is possible to carry out a compensation of frames or the like through an insertion of data for diversity (for example, see PTL 2), a scheduling of allocated times (for example, see PTL 3), a variable data rate (for example, see PTLs 4 and 5), and a variable channel configuration (for example, see PTL 6). In contrast to this, because the structure is fundamentally different from a system adopting a variable frame format such as the wireless LAN, it is difficult to apply these conventional technologies.

CITATION LIST

Patent Literature

PTL 1: Japanese Unexamined Patent Application Publication No. 2004-328570

PTL 2: Japanese Unexamined Patent Application Publication No. 2001-148646

PTL 3: Japanese Unexamined Patent Application Publication (Translation of PCT Application) No. 2009-506679

PTL 4: Japanese Unexamined Patent Application Publication No. 2008-236065

PTL 5: Japanese Patent No. 2855172

PTL 6: Japanese Unexamined Patent Application Publication No. 2007-89113

SUMMARY OF INVENTION

Technical Problem

An object of the present invention is to provide an excellent communication apparatus and a communication method, and a communication system in which it is possible to preferably carry out a communication operation by applying a space division multiple access where a wireless resource on a spatial axis is shared by a plurality of users.

A further object of the present invention is to provide an excellent communication apparatus and a communication method, and a communication system in which frames in a variable length frame format which are addressed to a plurality of users can be multiplexed and preferably transmitted.

A farther object of the present invention is to provide an excellent communication apparatus and a communication method, and a communication system in which frames in a variable length frame format can be multiplexed and preferably transmitted while an abrupt change in a total transmission power on the transmission side is avoided even in a case where transmission data lengths with respect to each of a plurality of users are not necessarily uniform.

Solution to Problem

The present application has been made by taking the above-mentioned problem into account, and the invention described in Claim 1 is a communication apparatus including:
  a frame generation unit that generates a plurality of frames that should be transmitted on a same time;
  a frame length control unit that applies a padding on at least a part of the plurality of frames generated by the frame generation unit and adjusts frame lengths; and
  a communication unit that multiplexes the plurality of frames after the frame lengths are adjusted, on a same time axis to be transmitted,
  in which the plurality of frames multiplexed on the same time are transmitted while eventually having a same frame length.

According to the invention described in Claim 2 of the present application, destinations of the plurality of frames multiplexed on the same time and transmitted by the communication apparatus described in Claim 1 are entirely or partially different communication apparatuses.

The invention described in Claim 3 of the present application is a communication apparatus including:
  a frame generation unit that generates a plurality of frames that should be transmitted on a same time with one or more other communication apparatuses;
  a frame length control unit that applies a padding on the frames generated by the frame generation unit and adjusts frame lengths; and
  a communication unit that multiplexes the plurality of frames after the frame lengths are adjusted, on the same time to be transmitted,
  in which the frames are transmitted on the same time with the other communication apparatuses while mutually having a same frame length.

According to the invention described in Claim 4 of the present application, in the communication apparatus described in Claim 3, destinations of the frames transmitted on the same time with the other one or more communication apparatuses are a same communication apparatus.

According to the invention described in Claim 5 of the present application, the communication unit of the communication apparatus described in Claim 1 or 3 is configured to multiplex the plurality of frames on the same time through one multiplexing system or a multiplexing system in combination of two or more among a space division multiplexing, a code division multiplexing, a frequency division multiplexing, and as orthogonal frequency division multiplexing to be transmitted.

According to the invention described in Claim 6 of the present application, the frame length control unit of the communication apparatus described in Claim 1 or 3 is configured to perform the padding by utilizing a bit or a symbol known between a communication apparatus that becomes a destination of the frame.

According to the invention described in Claim 7 of the present application, the communication unit of the communication apparatus described in Claim 1 is configured to include a plurality of antenna elements and allocate a wireless resource on a spatial axis to a plurality of communication apparatuses and multiplexes the plurality of frames on the same time by allocating a weight of an adaptive array antenna with respect to respective antenna blanches.

According to the invention described in Claim 8 of the present application, the same communication apparatus that is set as the destination or the frames by the communication apparatus described in Claim 4 with the other one or more communication apparatuses is configured to include a plurality of antenna elements and spatially separate the plurality of frames transmitted on the same time with the other one or more communication apparatuses by allocating a weight or an adaptive array antenna with respect to respective antenna blanches.

According to the invention described in Claim 9 of the present application, the frame length control unit of the communication apparatus described in Claim 1 or 3 is configured to perform the padding in combination of one or more of predetermined symbols in the case of a single carrier modulation, in combination of one or more of predetermined sub-carriers in the case of an orthogonal frequency division multiplexing, or in combination of a symbol and an orthogonal frequency division multiplexing symbol in a case where the padding is applied in units of symbol.

According to the invention described in Claim 10 of the present application, the frame length control unit of the communication apparatus described in Claim 1 or 3 is configured to change a combination of sub-carriers where the padding is performed in accordance with a padded symbol position in a case where the padding is performed on the frames in combination of orthogonal frequency division multiplexing symbols.

According to the invention described in Claim 11 of the present application, the frame length control unit of the communication apparatus described in Claim 1 or 3 is configured to collectively perform the padding in a front or a rear of a data section of the frame.

According to the invention described in Claim 12 of the present application, the frame length control unit of the communication apparatus described in Claim 1 or 3 is configured to disperse and arrange padding positions across an entire data section of the frame.

According to the invention described in Claim 13 of the present application, the frame length control unit of the communication apparatus described in Claim 1 or 3 is configured to select from a finite number of previously defined padding position patterns and perform a padding position.

According to the invention described in Claim 14 of present application, in a case where the frame length control unit of the communication apparatus described in Claim 1 or 3 changes a padding position pattern for each frame, the communication unit is configured to notify a frame reception side of information related to a padding position. For example, as described in Claim 15, the communication may notify of the information related to the padding positions by describing the information related to the padding position in a preamble section or a header section imparted to the eventually transmitted frame.

Also, as described in Claim 16, in a case where the padding is collectively performed in a front or a rear of a data section of the frame, if the notification of a length of the frame before the padding and a length of the frame after the padding is made as information related to the padding position, on the reception side, it is possible to identify an area on which the padding is applied.

Also, the invention described in Claim 17 of the present application is a communication method including:
- a frame generation step of generating a plurality of frames that should be transmitted on a same time;
- a frame length control step of applying a padding on at least a part of the plurality of frames generated by the frame generation unit and adjusting frame lengths; and
- a communication step of multiplexing the plurality of frames after the frame lengths are adjusted, on the same time to be transmitted,
- in which the plurality of frames multiplexed on the same time are transmitted while eventually having a same frame length.

Also, the invention described in Claim 18 of the present application is a communication method including:
- a frame generation step of generating a plurality of frames that should be transmitted on a same time with one or more other communication apparatuses;
- a frame length control step of applying a padding on the frames generated by the frame generation unit and adjusting frame lengths; and
- a communication unit step of multiplexing the plurality of frames after the frame lengths are adjusted, on the same time to be transmitted,
- in which the frames are transmitted on the same time with the other communication apparatuses while mutually having a same frame length.

Also, the invention described in Claim 19 of the present application is a communication system including:
- a first communication apparatus that applies a padding on at least a part of a plurality of frames that should be transmitted on a same time, adjusts frame lengths, and multiplexes the plurality of frames on the same time to be transmitted while eventually having a same frame length; and
- one or more second communication apparatus that receive the respective frames multiplexed on the same time as destinations of the plurality of frames.

It should be however noted that the "system" referred herein refers to an object where a plurality of apparatuses (or function modules that realize particular functions) are logically congregated, and whether or not the respective apparatuses and function modules are in a single casing does not particularly matter (hereinafter, the same applies).

Also, the invention described in Claim 20 of the present application is a communication system including:
- a plurality of first communication apparatuses that apply a padding on frames that should be mutually transmitted on a same time, adjust frame lengths, and respectively transmit on the same time while mutually having a same frame length; and
- a second communication apparatus that receives the frames multiplexed on the same time.

Advantageous Effects of Invention

According to the present invention, it is possible to provide the excellent communication apparatus and the communication method, and the communication system in which it is possible to preferably carry out the communication operation by applying the space division multiple access where the wireless resource on the spatial axis is shared by the plurality of users.

Also, according to the present invention, it is possible to provide the excellent communication apparatus and the communication method, and the communication system in which the frames in the variable length frame format can be multiplexed and preferably transmitted while an abrupt change in a total transmission power on the transmission side is avoided even in a case where transmission data lengths with respect to each of a plurality of users are not necessarily uniform.

According to the invention described in Claims 1, 17, and 19 of the present application, even if the frame lengths for each user are different from each other at a time point when passed over from the upper layer, since the respective frames multiplexed on the same time are transmitted while eventually having the same frame length by applying the padding with respect to the short frames, the frames in the variable length frame format can be multiplexed and preferably transmitted while the abrupt change in the total transmission power on the transmission side is avoided. Therefore, on the side of receiving the multiplexed frames, the reception power does not abruptly change any more, and it is possible to eliminate the operational instability of the AGC.

According to the invention described in Claim 2 of the present application, the destinations of the plurality of frames multiplexed on the same time and transmitted are the entirely or partially different communication apparatuses. Therefore, it is possible to improve throughput for the communication of one-to-many instead one-to-one, that is, the plurality of users as a whole.

According to the invention described in Claims 3, 18, and 20 of the present application, even in a case where the transmission addressed to the same communication apparatus on the same time is carried out with the other communication apparatus, since the transmission is carried out while eventually mutually having the same frame lengths, on the side of receiving the multiplexed frames, the reception power does not abruptly change any more, and the operational instability of the AGC is eliminated. That is, the frames in the variable length frame format can be multiplexed and preferably transmitted between the plurality of communication apparatuses.

According to the invention described in Claim 4 of the present application, in the communication apparatus described in Claim 3, the destinations of the frames transmitted on the same time with the other one or more communication apparatuses are the same communication apparatus. Therefore, if is possible to improve throughput for the communication of many-to-one instead one-to-one, that is, the plurality of users as a whole.

According to the invention described in Claim 5 of the present application, the plurality of frame lengths eventually output from the PHY layer are uniformed for each frame transmission time and can be multiplexed on the same time through the one multiplexing system or the multiplexing system in combination of two or more among the code division multiplexing, the frequency division multiplexing, and the orthogonal frequency division multiplexing.

According to the invention described in Claim 6 of the present application, on the communication apparatus side that receives the frames on which the padding is applied by utilizing the known symbol, when the reception processing for the relevant frames is carried out, the relevant known symbol is used as a pilot symbol and can be utilized again as an auxiliary for the reception operation such as the timing error estimation and the channel estimation. Also, as described in Claim 2 of the present application, when the frames are subjected to the space division multiplexing, each of the plurality of receiving communication apparatuses can utilize the padded known symbol for obtaining the spatial diversity gain.

According to the invention described in Claim 7 of the present application, it is possible to allocate the wireless resource on the spatial axis to the plurality of communication apparatuses and multiplex the plurality or frames on the same time.

According to the invention described in Claim 8 of the present application, the same communication apparatus that is set as the destination of the frames can spatially separate the plurality of frames transmitted on the same time.

According to the invention described in Claim 9 of the present application, in a case where the padding is applied in units of symbol, if is possible to perform the padding in combination of one or more of the predetermined symbols in the case of the single carrier modulation, in combination of one or more of the predetermined sub-carriers in the case of the orthogonal frequency division multiplexing, or in combination of the symbol and the orthogonal frequency division multiplexing symbol.

According to the invention described in Claim 10 of the present application, while the combination of the padded sub-carriers is changed in accordance with the symbol position where the padding is carried out, since the frequency error estimation, the timing error estimation, and the channel estimation are carried out by using the sub-carriers dispersed across the entire symbol, it is possible to improve the estimation accuracy.

According to the invention described in Claim 11 of the present application, by collectively performing the padding in the front of the data section of the frame, and by using the symbol as the pilot symbol on tine reception side of the frames, the effect of the reception auxiliary such as the frequency error estimation, the timing error estimation, and the channel estimation is increased.

According to the invention described in Claim 12 of the present application, by arranging the padding positions to be evenly dispersed within the data section, the tracking of the frequency error estimation, the timing error estimation, and the channel estimation can be carried out across the frame.

Alternatively, by densely arranging the padding positions in the frame front, the effect in a case where the padding is carried out in the front of the data section is also obtained.

According to the invention described in Claim 13 of the present application, since the padding position is carried out through the selection is made among the previously defined finite number of padding position patterns, the notification method of the padding information with respect to the reception side of the frames on which the padding is applied becomes simplified.

According to the invention described in Claims 14 and 15 of the present application, in a case where the padding position pattern is changed for each frame, by notifying the frame reception side of the information related to the padding position, on the reception side of the frames on which the padding is applied, the position on which the passing is applied in the frame is recognized, and the original data part can be decoded after the padding area is removed.

Further objects, features, and advantages of the present invention will become apparent from a more detailed description based on embodiments of the present invention which will be described below and the attached drawings.

DESCRIPTION OF EMBODIMENTS

Hereinafter, embodiments of the present invention will be described in detail with reference to the drawings.

Figure 1:
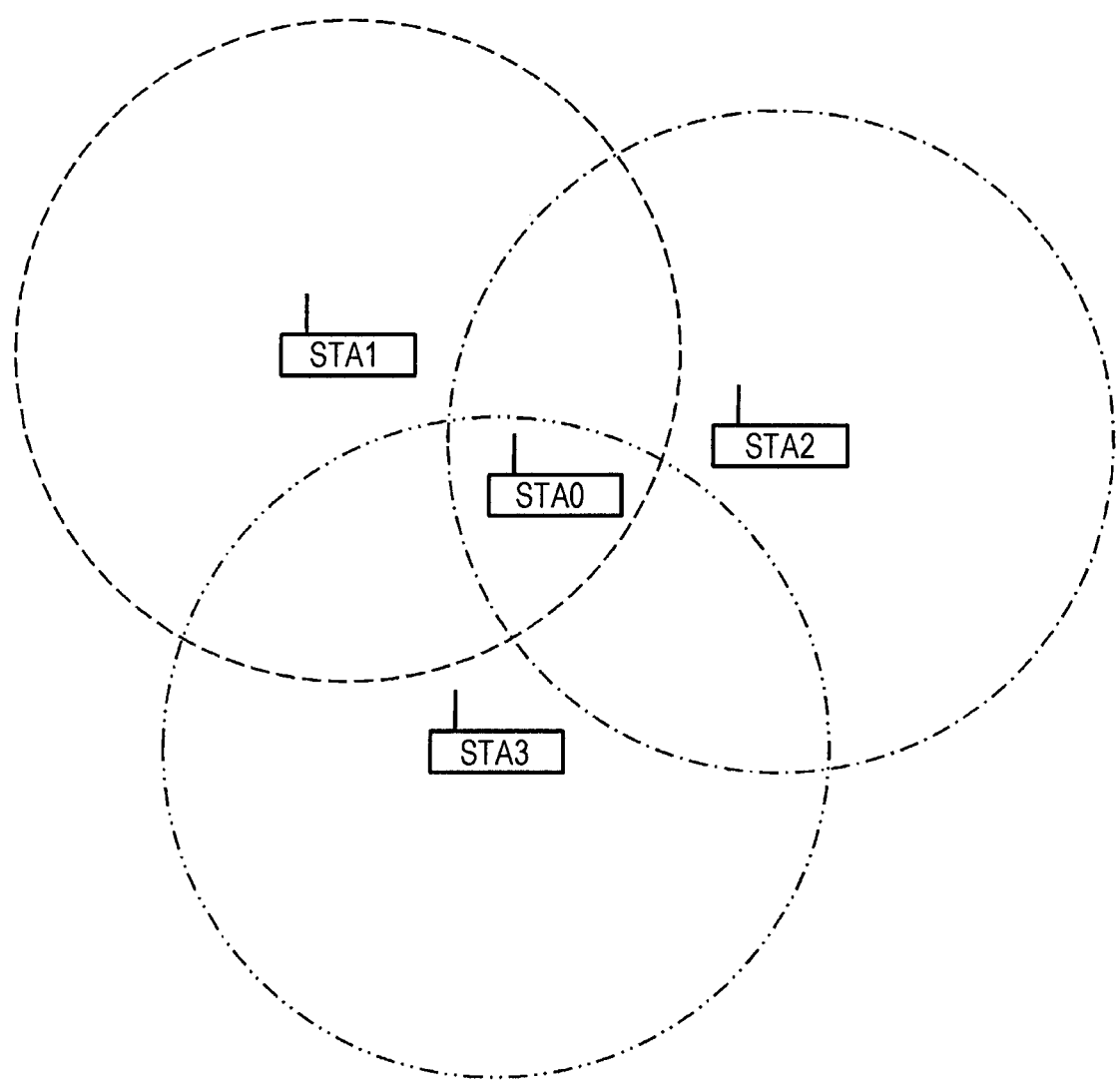
FIG. 1 schematically illustrates a configuration of a communication system according to one embodiment of the present invention.

FIG. 1 schematically illustrates a configuration of a communication system according to one embodiment of the present invention. The communication system illustrated in the drawing is composed of a communication station STA0 that operates as an access point (AP) and a plurality of communication stations STA1, STA2, and STA3 that operates as a terminal station (client device) (MT).

The respective communication stations STA1, STA2, and STA3 contain the communication station STA0 in the a direct communication with the STA0 (in other words, the respective communication stations STA1, STA2, and STA3 are placed under the control of the STA0 as the access point and constitute BBS (Basic Service Set)). It should be however noted that the respective communication stations STA1, STA2, and STA3 as the terminal stations do not necessarily need to exist within the mutual communication range, and a direct communication between the terminal stations will not be referred to below.

Herein, the STA0 as the access point is composed of the communication apparatus that performs a space division multiple access by an adaptive array antenna provided with a plurality of antennas and allocates a wireless resource on a spatial axis to a plurality of users to multiplex frame communications. That is, the STA0 is the communication apparatus compliant with a new standard such as IEEE802.11ac which performs a one-to-many frame communication by multiplexing two or more frames of which destination communication stations are different from each other on a same time axis and separating the frames of which destinations are the local station which are multiplexed and transmitted on the same tune axis by the two or more communication stations for each transmission source. Since the STA0 is equipped with more antennas, it is possible to increase the number of terminal stations that enables the spatial multiplexing. Of course, the STA0 may perform not only the one-to-many frame communication with the respective communication stations STA1, STA2, and STA3 by applying the space division multiple access but also one-to-one frame communication with the respective communication stations STA1, STA2, and STA3 individually.

On the other hand, the communication stations STA1, STA2, and STA3 as the terminal stations are composed of the communication apparatuses that perform the space division multiple access by the adaptive array antenna provided with the plurality of antennas but performs a user separation only at the time of reception and does not perform the user multiplexing of the transmission frames, so that it is not necessary to equip with as many antennas as the access point. It should be noted that at least a part of the terminal stations among the terminal stations may be a communication apparatus compliant with conventional standard such as IEEE802.11a. In other words, the communication system illustrated in FIG. 1 is a communication environment in which the communication station of the relevant new standard exists in a mixed manner with the communication station of the conventional standard.

Figure 2:
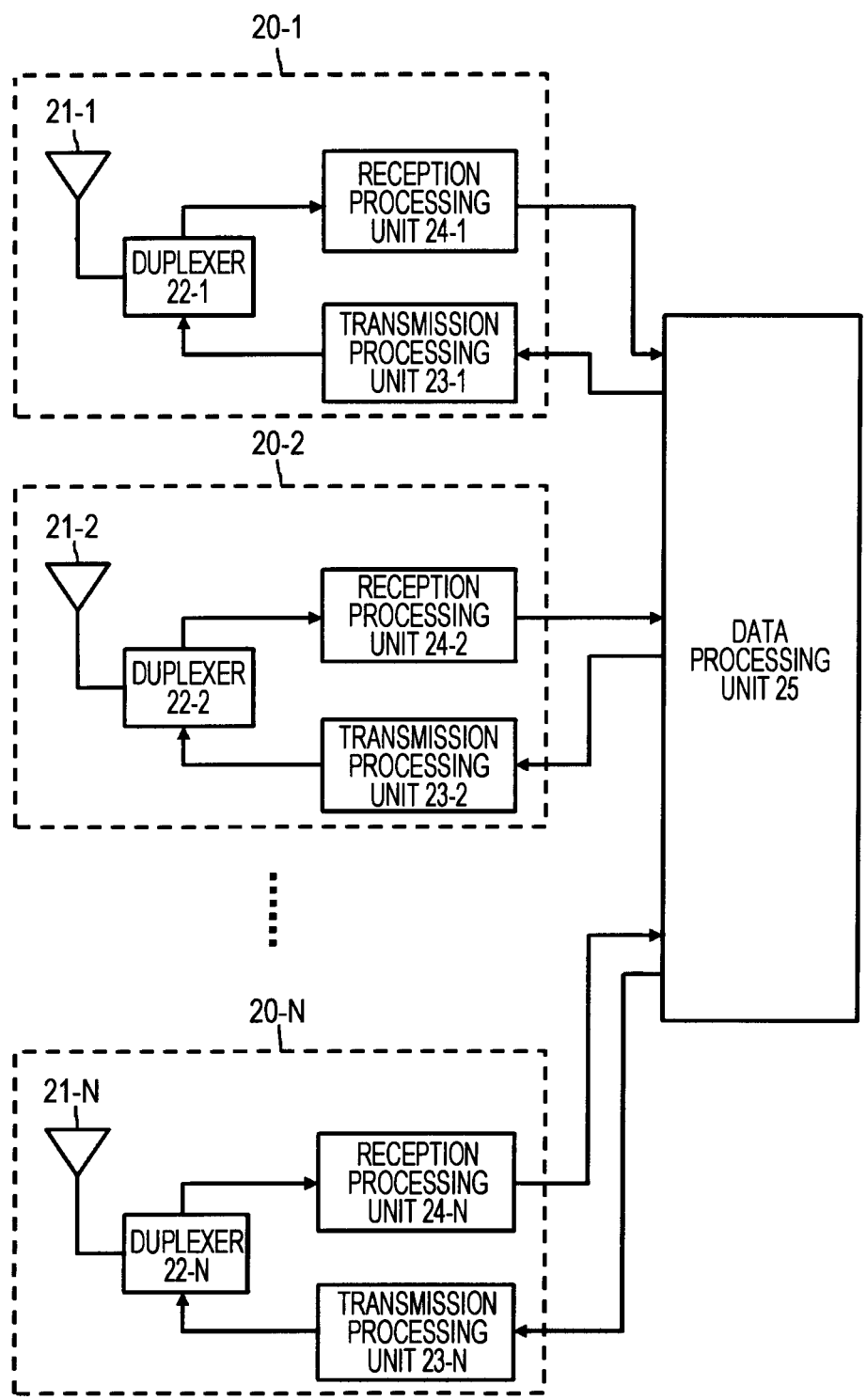
FIG. 2 illustrates a configuration example of a communication apparatus that can perform a multiplexing of a plurality of users by applying a space division multiple access.

FIG. 2 illustrates a configuration example of a communication apparatus that can perform a multiplexing of a plurality of users by applying the space division multiple access. In the communication, system illustrated in FIG. 1, the communication station STA0 operating as the access point and some corresponding to the space division multiple access among the communication stations STA1 to STA3 operating as the terminal stations have the configuration illustrated in FIG. 2 and are set to perform a communication operation in conformity to the new standard.

The communication apparatus illustrated in the drawing is composed of N pieces of transmission reception branches 20-1, 20-2, . . . , 20-N respectively provided with the antenna elements 21-1, 21-2, . . . , 21-N and a data processing unit 25 that is connected to the respective transmission reception branches 20-1, 20-2, . . . , 20-N and performs a processing on transmission reception data (it should be however noted that N is an integer larger than or equal to 2). These plurality of antenna elements 21-1, 21-2, . . . , 21-N can function as an adaptive array antenna by applying an appropriate weight of the adaptive array antenna. The communication station STA0 as the access point performs the space division multiple access by the adaptive array antenna but can improve the number of terminal stations that can be contained through a multiple access by having many antenna elements.

In the respective transmission reception branches 20-1, 20-2, . . . , 20-N, the respective antenna elements 21-1, 21-2, . . . , 21-N are connected to transmission processing units 23-1, 23-2, . . . , 23-N and reception processing units 24-1, 24-2, . . . , 24-N via duplexes 22-1, 22-2, . . . , 22-N.

When transmission data is generated in accordance with the transmission request from an upper-layer application, the data processing unit 25 sorts our the transmission data to the respective transmission reception branches 20-1, 20-2, . . . , 20-N. Also, in a case where the communication apparatus is the STA0 operating as the access point, when the transmission data addressed to a plurality of users, that is, the respective communication stations STA1, STA2, and STA3 is generated in accordance with the transmission request from the upper-layer application, the data processing unit 25 multiplies a transmission weight of the adaptive array antenna for each transmission reception branch and performs a spatial separation on the transmission data to be thereafter sorted out to the respective transmission reception branches 20-1, 20-2, ..., 20-N. It should be however noted that the "spatial separation" at the time of the transmission referred herein means only a user separation for the spatial separation for each user that transmits the frame at the same time.

The respective transmission processing units 23-1, 23-2, ..., 23-N apply a predetermined signal processing such as encoding and modulation on digital baseband transmission signals supplied from the data processing unit 25, thereafter perform a D/A conversion, further perform an up-convert to RF (Radio Frequency) signals, and perform a power amplification. Then, the above-mentioned transmission RF signals are supplied via the duplexers 22-1, 22-2, ..., 22-N to the antenna elements 21-1, 21-2, ..., 21-N and emitted into air.

Meanwhile, in the respective reception processing units 24-1, 24-2, ..., 24-N, when the RF reception signals from the antenna elements 21-1, 21-2, ..., 21-N are supplied via the duplexers 22-1, 22-2, ..., 22-N, the RF reception signals are subjected to a low-noise amplification, then a down-convert to analog baseband signals, and thereafter a D/A conversion, and are further applied with predetermined signal processings such as decoding and demodulation.

The data processing unit 25 multiplies a reception weight of the adaptive array antenna with respect to the digital reception signals input from the respective reception processing units 24-1, 24-2, ..., 24-N respectively to perform a spatial separation, and when the transmission data from each user, that is, each of the communication stations STA1, STA2, and STA3 as reproduced, passes the transmission data over to the upper-layer application. It should be however noted that the "spatial separation" at the time of the reception referred herein includes both meanings of a user separation for the spatial separation for each user that transmits the frames at the same time and a channel separation for separating the spatially multiplexed MIMO channel into the plurality or original steams.

Herein, in order for the plurality of antenna elements 21-1, 21-2, ..., 21-N to function the adaptive array antenna, the data processing unit 25 controls the respective transmission processing units 23-1, 23-2, ..., 23-N and the respective reception processing units 24-1, 24-2, ..., 24-N so that the transmission weight of the adaptive array antenna is applied on the transmission signals sorted out to the respective transmission reception branches 20-1, 20-2, ..., 20-N and also the reception weight of the adaptive array antenna is applied on the reception signals from the respective transmission reception branches 20-1, 20-2, ..., 20-N. Also, prior to the space division multiple access with the respective communication stations STA1, STA2, and STA3, the data processing unit 25 learns the weight of the adaptive array antenna. For example, by using a predetermined adaptation algorithm seen as RLS (Recursive Least Square) with respect to a training signal (which will be described below) that is composed of the known sequences received from the respective communication partners STA1 to STA3, it is possible to carry out the learning on the weight of the adaptive array antenna.

The data processing unit 25 executes a processing on respective layers of a communication protocol in a media access control (Media Access Control: MAC) system mounted in the communication system illustrated in FIG. 1, for example. Also, the respective transmission reception branches 20-1, 20-2, ..., 20-N execute a processing equivalent to PHY layer, for example. As will be described below, the plurality of frames having different lengths are transmitted from the upper layer, but the lengths of the frames finally transmitted from the PHY layer are set to be uniform. It should be however noted that whether either the data processing unit 25 or the respective transmission reception branches 20-1, 20-2, ..., 20-N perform the above-mentioned control on the frame lengths is not particularly limited.

It should be noted that the communication stations STA1, STA2, and STA3 as the terminal stations perform the space division multiple access by the adaptive array antenna provided with the plurality of antennas, but the user separation is carried out only at the time or the reception and the user separation at the time of the transmission, that is, the multiplexing of the transmission frames is not carried out, so that it is not necessary to equip with as many antennas as the access point.

Figure 3:
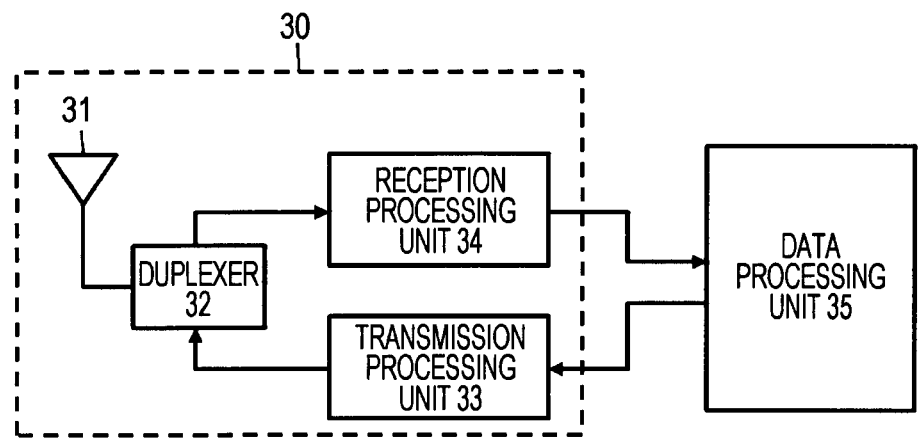
FIG. 3 illustrates a configuration example of a communication apparatus compliant with a conventional standard such as IEEE802.11a without applying the space division multiple access.

Also, FIG. 3 illustrates a configuration example of a communication apparatus compliant with the conventional standard such as IEEE802.11a without applying the space division multiple access. An the communication system illustrated in FIG. 1, among the communication stations STA1 to STA3 operating as the terminal stations, one that is provided with the configuration illustrated in FIG. 3 and performs a communication operation only in conformity to the conventional standard also exists.

The communication apparatus illustrated in the drawing is composed of a transmission reception branch 30 provided with an antenna element 31 and a data processing unit 35 that is connected to this transmission reception branch 30 and performs a processing on transmission reception data. Also, in the transmission reception branch 30, the antenna element 31 is connected to a transmission processing unit 33 and a reception processing unit 34 via a duplexer 32.

The data processing unit 35 generates transmission data in accordance with the transmission request from the upper-layer application to be output to the transmission reception branch 30. The transmission processing unit 33 applies a predetermined signal processing such as encoding and modulation on digital baseband transmission signals, and thereafter performs a D/A conversion, further performs an up-convert to RF signals, and performs a power amplification. Then, the above-mentioned transmission RF signals are supplied via the duplexer 32 to the antenna element 31 and emitted into air.

Meanwhile, in the reception processing unit 34, when the RF reception signals from the antenna element 31 are supplied via the duplexer 32, the RF reception signals are subjected to a low-noise amplification, then a down-convert to analog baseband signals, and thereafter a D/A conversion, and are further applied with a predetermined signal processing such as decoding and demodulation. The data processing unit 35 reproduces the original transmission data from the digital reception signals that are input from the reception processing unit to be passed over to the upper-layer application.

In the communication system illustrated in FIG. 1, the STA0 as the access point learns the weight or the adaptive array antenna by obtaining the transfer function between the respective antenna elements included in the adaptive array antenna provided to the local station and the respective antenna elements provided to the communication stations STA1 to STA3. Alternatively, by using a predetermined adaptation algorithm such as RLS with respect to a training signal composed of the known sequences received from the respective communication partners STA1 to STA3, it is possible to carry out the learning on the weight of the adaptive array antennas. Then, the STA0 forms a directivity with respect to the respective communication stations STA1 to STA3 on the basis of the weight of the adaptive array antenna which is learnt though any one of the methods. According to this, the STA0 can spatially separate the transmission frames multiplexed on the same time which are addressed to each of the communication stations STA1 to STA3 or the reception frames multiplexed on the same time from the respective communication stations STA1 to STA3, that is, can realize the space division multiple access where the wireless resource on the spatial axis is shared by the plurality of users.

In IEEE802.11 that is the conventional wireless LAN standard, while an access control procedure based on a carrier sense such as CSMA/CA (Carrier Sense Multiple Access with Collision Avoidance) is adopted, respective communication stations are set to avoid collisions of carriers at a time of random channel access.

Also, in the wireless communication, it is known that a hidden terminal problem occurs in which an area exists where the communication stations cannot mutually communicate directly. In IEEE802.11, as a methodology for solving this, RTS/CTS handshake is used in combination. A communication station at a data transmission source transmits a transmission request frame (RTS: Request To Send), and a data transmission is started in response to a reception of a confirmation notification frame (CTS: Clear To Send) from a data transmission destination. Then, when the hidden terminal receives at least one of the frames RTS and CTS whose destination is not the local station, the transmission stop period is set on the basis of the Duration information described in the reception frame to avoid the collisions. The hidden terminal for the transmission station receives the CTS, sets the transmission stop period, and avoids the collisions with the data frames, and the hidden terminal for the reception station receives the RTS, stops the transmission period, and avoids the collisions with the ACK. By using the RTS/CTS handshake in combination with the CSMA/CA control procedure, reduction in overhead of the collisions in an overloaded state may be realized in some cases.

Also in the communication system illustrated in FIG. 1, the RTS/CTS handshake can be used in combination with the CSMA/CA control procedure.

Figure 4:
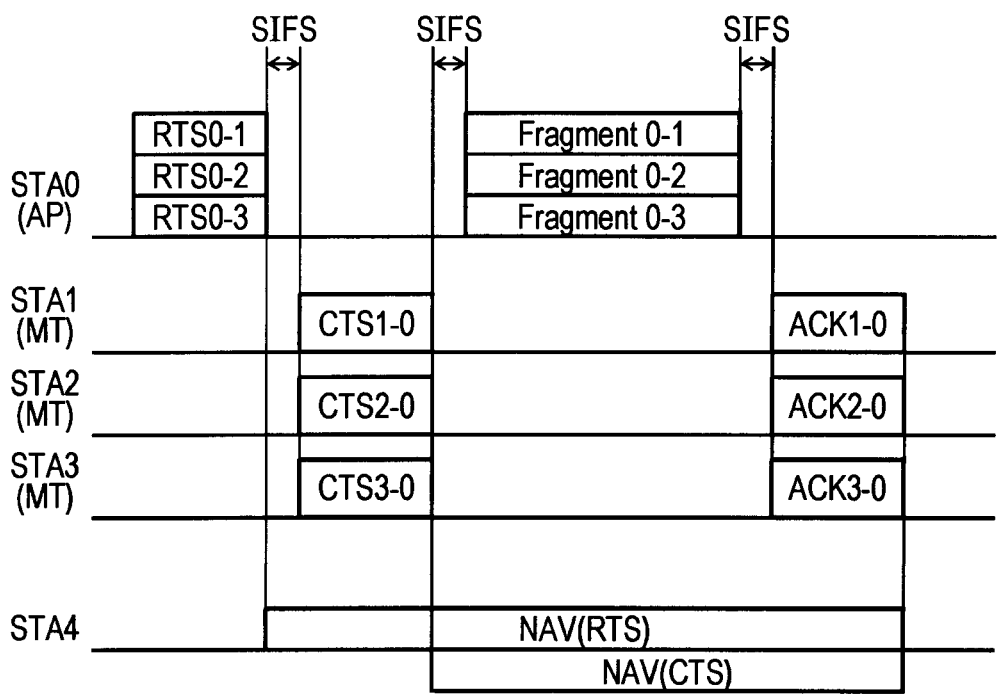
FIG. 4 illustrates a sequence-example in a case where in the communication system illustrated in FIG. 1, a communication station STA0 operating as an access point becomes a data transmission source, respective communication stations STA1 to STA3 operating as terminal stations become data transmission destinations, and the STA0 multiplexes transmission frames addressed to the respective communication stations STA1 to STA3 on a spatial axis to be transmitted at the same time.

FIG. 4 illustrates a sequence example in a case where in the communication system illustrated in FIG. 1, the communication station STA0 operating as the access point becomes a data transmission source, the respective communication stations STA1 to STA3 operating as the terminal stations become data transmission destinations, and the STA0 multiplexes the transmission frames addressed to the respective communication stations STA1 to STA3 on the spatial axis to be transmitted at the same time. It should be noted that a communication station STA4 in FIG. 4 is not illustrated in FIG. 1 but is set as a hidden terminal existing within at least one of communication ranges of the communication stations STA0 to STA3.

The STA0 previously performs the physical carrier sense, checks that the media is clear, further performs the back-off, thereafter utilizes the weight of the adaptive array antenna, and transmits a plurality of RTS frames (RTS 0-1, RTS 0-2, and RTS 0-3) addressed to the respective communication stations STA0 to STA3 at the same time through the space division multiplexing.

In a case where the RTS frame that does not include the local station in the destination is received, the STA4 that follows the conventional standard sets the counter value of the NAV on the basis of the duration information described in the relevant frame (widely known) and refrains from the transmission operation.

When it is recognized that the received RTS frame is addressed to the local stations, after a predetermined inter frame space SIFS (Short Inter Frame Space) elapses since the reception of the relevant frame is ended, the respective communication stations STA1, STA2, and STA3 transmit CTS frames (CTS 1-0, CTS 2-0, and CTS 3-0) addressed to the STA0 that is the RTS transmission source at the same time.

After the transmission of the RTS frame is completed, the STA0 stands by the reception of the CTS frames respectively replied from the respective destinations of the RTS frames. At that time, since the space division multiple access with the respective communication stations STA1, STA2, and STA3 is carried out by utilizing the weight of the adaptive array antenna, it is possible to receive the plurality of simultaneously received CTS frames (CTS 1-0, CTS 2-0, and CTS 3-0 through the separation on the spatial axis.

On the other hand, in a case where any of the CTS frames that does not contain the local station as the destination is received, the STA4 that follows the conventional standard sets the counter value of the NAV on the basis of the information described in the duration in the relevant frame (widely known) and refrains from the transmission operation.

After the predetermined inter frame space SIFS elapses since the reception of the CTS frames from the respective communication stations STA1, STA2, and STA3, the STA0 respectively transmits data frames (Fragment 0-1, Fragment 0-2, and Fragment 0-3) addressed to each of the respective communication stations STA1, STA2, and STA3. The STA0 transmits the plurality of data frames at the same time through the space division multiplexing by utilizing the above-mentioned learnt weight of the adaptive array antenna. According to this, it is possible to improve throughput for the plurality of users as a whole. It should be noted that the data frames to be transmitted may be limited to only one having the communication station that can receive the CTS frame as the destination.

In contrast to this, when the respective communication stations STA1, STA2, and STA3 complete the reception of the data frames (Fragment 0-1, Fragment 0-2, and Fragment 0-3 respectively addressed to the local stations, after the predetermined inter frame space SIFS elapses, ACK frames (ACK 1-0, ACK 2-0, and ACK 3-0) are replied at the same time.

The plurality of antenna elements of the STA0 already function as the adaptive antenna and can spatially separate the plurality of ACK frames (ACK 1-0, ACK 2-0, and ACK 3-0) received at the same time.

Figure 5:
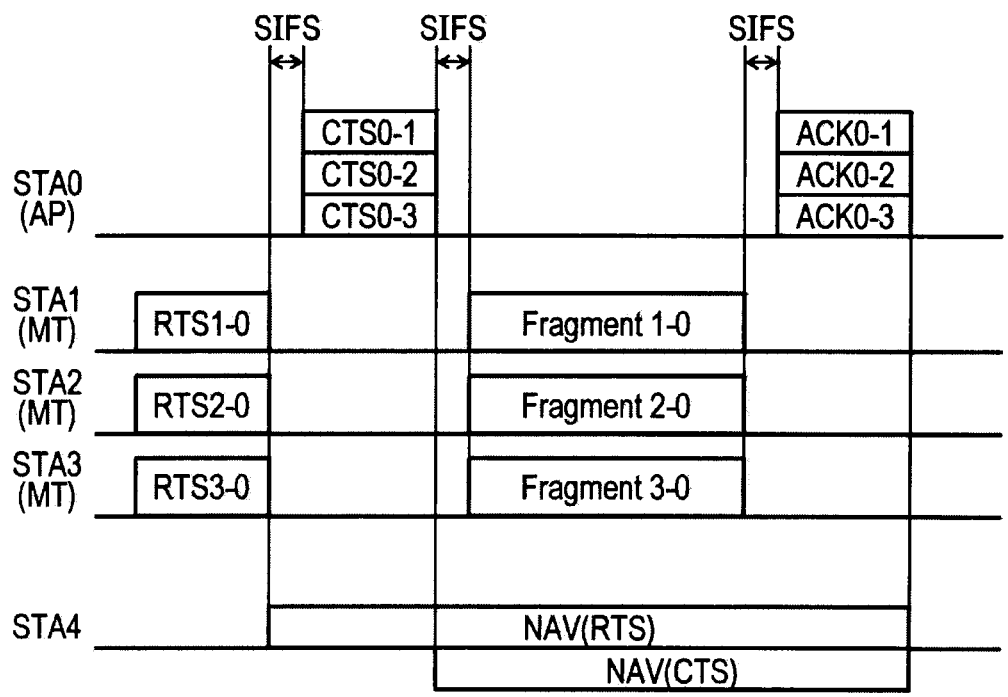
FIG. 5 illustrates a sequence example in a case where in the communication system illustrated in FIG. 1, the respective communication stations STA1 to STA3 operating as the terminal stations respectively become the data transmission sources, the communication station STA0 operating as the access point becomes the data transmission destination, and the respective communication stations STA1 to STA3 multiplex the transmission frames addressed to the communications station STA0 on the spatial axis to be transmitted at the same time.

Also, FIG. 5 illustrates a sequence example in a case where in the communication system illustrated in FIG. 1, the respective communication stations STA1 to STA3 operating as the terminal stations respectively become the data transmission sources, the communication station STA0 operating as the access point becomes data transmission destination, and the respective communication stations STA1 to STA3 multiplex the transmission frames addressed to the communication station STA0 on the spatial axis to be transmitted at the same time. It should be noted that a communication station STA4 in FIG. 5 is not illustrated in FIG. 1 but is set as a hidden terminal existing within at least one of communication ranges of the communication stations STA0 to STA3.

The respective communication stations STA1 to STA3 previously respectively perform the physical carrier sense, check that the media is clear, further perform the back-off, and thereafter transmit RTS frames (RTS 1-0, RTS 2-0, and RTS 3-0) addressed to the STA0 at the same time.

In a case where any RTS frame that does not contain the local station in the destination is received, the STA4 that follows the conventional standard sets the counter value of the NAV on the basis of the information described in the duration in the relevant frame (widely known) and refrains from the transmission operation.

Since the space division multiple access with the respective communication stations STA1, STA2, and STA3 is carried out by utilizing the weight of the adaptive array antenna, the STA0 can receive the plurality of simultaneously received RTS frames through the separation on the spatial axis. Then, when it is recognized that the received respective RTS frames are addressed to the local stations, after the predetermined inter frame space SIFS elapses since the reception of the relevant frame is ended, the STA0 transmits a plurality of CTS frames (CTS 0-1, CTS 0-2, and CTS 0-3) setting the respective communication stations STA1 to STA3 as the respective destinations at the same time through the space division multiplexing by utilizing the weight of the adaptive array antenna.

After the transmission of the RTS frame is completed, the respective communication stations STA1, STA2, and STA3 stand by for the reception of the CTS frame replied from the STA0 which is the destination station of the RTS frame. Then, in response to the reception of the CTS frame from the STA0, the respective communication stations STA1, STA2, and STA3 transmit the data frames (Fragment 1-0, Fragment 2-0, and Fragment 3-0) addressed to the STA0 at the same time. According to this, it is possible to improve throughput for the plurality of users as a whole.

On the other hand, in a case where any of the CTS frames that does not contain the local station as the destination is received, the STA4 that follows the conventional standard sets the counter value of the NAV on the basis of the information described in the duration in the relaxant frame (widely known) and refrains from the transmission operation.

Since the space division multiple access with the respective communication stations STA1, STA2, and STA3 is carried our by utilizing the weight of the adaptive array antenna, the STA0 can receive the plurality of simultaneously received data frames through the separation on the spatial axis Then, when it is recognized that the received respective data frames are addressed to the local stations, after the predetermined inter frame space SIFS elapses since the reception of the relevant frame is ended, the STA0 transmits the plurality of ACK frames (ACK 0-1, ACK 0-2, and ACK 0-3) respectively addressed to the respective communication stations STA1 to STA3 at the same time through the space division multiplexing by utilizing the weight of the adaptive array antenna.

Then, by respectively receiving the ACK frames from the STA0 (ACK 0-1, ACK 0-2, and ACK 0-3), the respective communications stations STA1, STA2, and STA3 successfully end the data transmission sequences to the STA0.

In general, the wireless LAN adopt a packet communication system, but the traffic amounts at which the respective users desire to communicate vary. For this reason, a difference occurs in the lengths of packets (frames). In a case where the frames addressed to a plurality of users are multiplexed and transmitted at the same time by the space division multiple access, when an abrupt change in the total transmission power takes place because of the difference in the frame lengths, the problem of inducing an unstable operation of the AGC along with an abrupt of the reception power on the reception side or the like occurs (described above). Also, if a part of the frames to be multiplexed is ended in advance and the transmission of the other frames is continued, the band where the communication can be carried out cannot be effectively utilized, and the effect of the space division multiple access is reduced.

For this reason, even if the transmission data length for each user varies, the frames multiplexed on the same time need to be transmitted while eventually having the same frame length.

For example, in the communication sequence example illustrated in FIG. 4, the respective frames of the RTS, the CTS, and the ACK are expected to have the uniform frame length, but the plurality of data frames (Fragment 0-1, Fragment 0-2, and Fragment 0-3 which are transmitted by the STA0 may have different frame lengths which are transmitted from the MAC layer to the PHY layer due to the difference in the transmission data amounts for each destination.

Also, in the communication sequence example illustrated in FIG. 5, the respective frames of the RTS, the CTS, and the ACK are expected to have the uniform frame length, but the data frames (Fragment 1-0, Fragment 2-0, and Fragment 3-0) which are respectively addressed by the respective communication stations STA1, STA2, and STA3 to the STA0 may have different frame lengths which are transmitted from the MAC layer to the PHY layer due to the difference in the transmission data amounts requested from due to the difference in the transmission data amounts requested from each upper-layer application.

In view of the above, according to the present embodiment, a method of applying a padding on a shorter one among a plurality of frames to be spatially multiplexed, for example, applying the padding in the PHY layer to align with one having a longer frame length is adopted.

For example, in the communication sequence example illustrated in FIG. 4 when the data frames (Fragment 0-1, Fragment 0-2, and Fragment 0-3) addressed to the respective communication stations STA1 to STA3 are transmitted from the MAC layer to the PHY layer the communication station STA0, it is determined whether or not it is necessary to perform the padding because of the difference in the frame lengths in the PHY layer. Then, the padding is applied on the frame (the frame length is short) where it is determined that the padding is needed, and after the frame lengths are set to eventually become uniform, the frames are transmitted to the respective communication stations STA1 to STA3 that become the destinations through the space division multiplexing. According to this, it is possible to attain the desired effect of the space division multiple access.

Also, in the communication sequence example illustrated in FIG. 5, it is premised on that the frame length eventually aligned for each frame transmission time is mutually recognized in advance between the respective communication stations STA1 to STA3 that become the transmission sources of the data frames. For example, when the RTS frames or the CTS frames are exchanged, the specification of the frame length may be received from the STA0 as the access point. Alternatively, only in a case where the data frames are transmitted to the access point STA0 from the terminal stations STA1 to STA3 in up link, a fixed length frame format may be used. Then, in the respective communication stations STA1 to STA3, when the data frames (Fragment 1-0, Fragment 2-0, and Fragment 3-0) addressed to the STA0 are transmitted from the MAC layer to the PHY layer, in each of the PHY layer, it is determined whether or not it is necessary to perform the padding because of the difference in the frame lengths. Then, in the communication station where it is determined that the padding is needed, the padding is applied on its own transmission frame to eventually align the frame length with the transmission frame from the other communication station. According to this, it is possible to attain the desired effect of the space division multiple access.

It should be noted that in the communication sequence examples illustrated in FIG. 4 and FIG. 5, in a case where the padding is applied on a part of data frames to make the frame lengths uniform, the respective frames of the RTS, no limitation is imposed with regard to the transmission reception method of the CTS and the ACK.

Figure 6A:
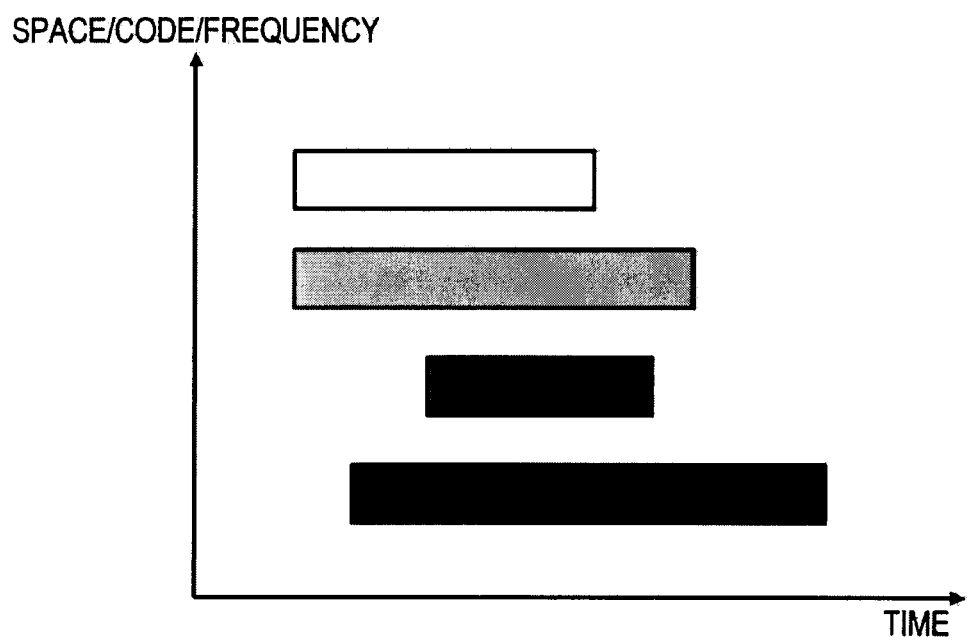
FIG. 6A illustrates a situation image in which lengths of a plurality of frames that should be multiplexed or a same time vary.
Figure 6B:
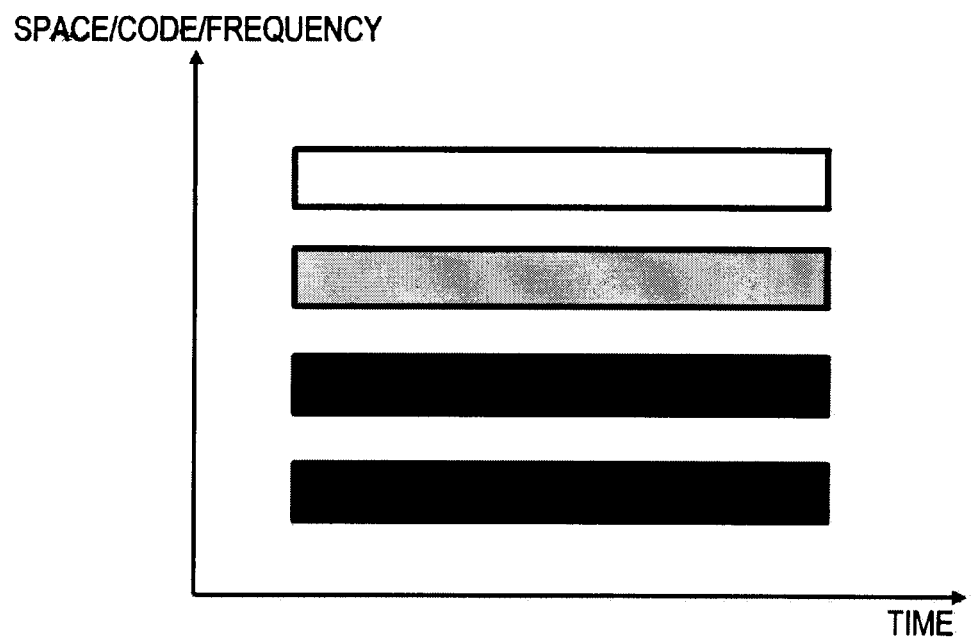
FIG. 6B illustrates an image in which padding is applied in a case where the plurality of frames having different lengths are multiplexed on the same time.

FIG. 6A illustrates a situation in which lengths of a plurality of frames transmitted from the upper layer (for example, the MAC layer) which should be multiplexed on a same time vary. FIG. 6B illustrates an image in which a padding is applied in a case where a plurality of frames having different lengths which are transmitted from the upper layer (for example, the MAC layer) are multiplexed on the same time so that the lengths of the frames finally transmitted from the PHY layer become uniform.

It should be however noted that it suffices that the frames finally transmitted from the PHY layer are aligned for each frame transmission time, and it is not necessary to regularly align to a constant length throughout the entire system (that is, between the frames where the transmission times are different).

The vertical axis in FIG. 6 is an axis representing a wireless resource for multiplexing a plurality of frames. Herein, the space division multiplexing is illustrated but this applies similarly also in a case where a code division multiplexing, a frequency division multiplexing, or an orthogonal frequency division multiplexing is carried out or two or more are combined among these multiplexing systems.

It should be noted that the "length" of the frame mentioned herein includes meanings of a temporal length, the number of symbols, the number of bits, and a data size. Also, the padding to the frame can be carried out while the bit or the symbol is set as the minimum unit.

Herein, the bit or the symbol utilized for the padding is preferably known between the communication apparatuses that exchange the padded frame.

For example, in the sequence example illustrated in FIG. 4, while the access point STA0 multiplexes the data frames addressed to the plurality of terminal stations STA1 to STA3 on the same time to be transmitted, when the access point STA0 applies the padding on any of the data frames, the padding is set to be carried out by utilizing the bit or the symbol known between the terminal apparatuses that become the destination of the relevant data frame.

Also, in the sequence example illustrated in FIG. 5, while the terminal stations STA1 to STA3 transmit the data frames addressed to the access point STA0 on the same time, when any of the terminal stations STA1 to STA3 applies the padding on the frame, the padding is set to be carried out by utilizing the bit or the symbol known with the access point STA0.

In particular, in a case where the known symbol is utilized for the padding, when the reception processing of the padded frame is carried out, the relevant known symbol is used as a pilot symbol and can be utilized again as an auxiliary for the reception operation such as a frequency error estimation, a timing error estimation, and a channel estimation. Also, when the data frames are subjected to the space division multiplexing as illustrated in FIG. 4, on the receiving sides of the respective terminal stations STA1 to STA3, the padded known symbol can be utilized for obtaining a spatial diversity gain.

In a case where the padding is applied in unit a of bit, it is possible to carry out the padding by the input or the output of error correction coding or the transmission processing, or it is possible to carry out the padding by the input or the output of interleave. If the padding is carried out in a latter stage of the processing, which can be utilized as the known symbol also after the symbol modulation, and it is preferable to carry out the padding by the correction output or the interleave output as meet as possible.

Meanwhile, in a case where the padding is applied in units of symbol, for the minimum unit, a symbol of a single carrier modulation or a symbol on one sub-carrier of the orthogonal frequency division multiplexing is conceivable. Also, the unit of the padding is not limited to this, and a combination of ono or more predetermined symbols in the case of the single carrier modulation as well as a combination of a symbol of one or more predetermined sub-carriers in the case of the orthogonal frequency division multiplexing and an orthogonal frequency division multiplexing symbol are conceivable.

Herein, it is also possible to change the combination of the predetermined sub-carriers on the basis of positions of the orthogonal frequency division multiplexing symbols, where the padding is applied. According to this, the known symbols can be arranged in still more sub-carriers across the frame.

Figure 7A:
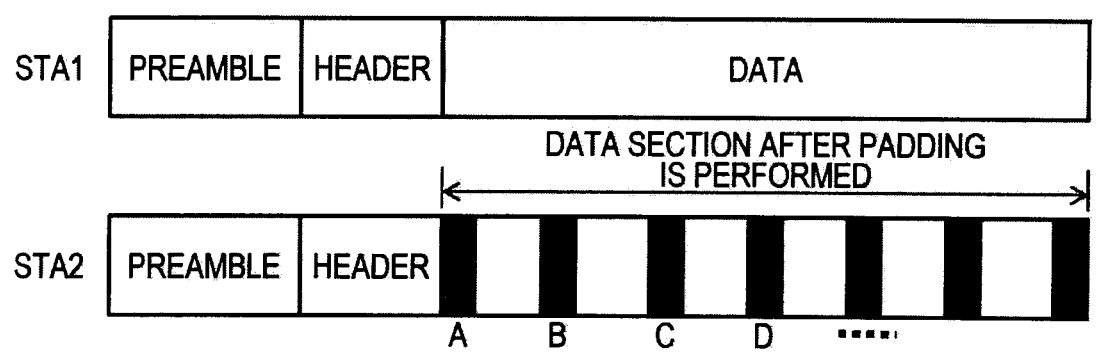
FIG. 7A exemplifies a situation in which a combination of sub-carriers where the padding is performed is changed by positions A to B of orthogonal frequency division multiplexing symbols or which the padding is applied.
Figure 7B:
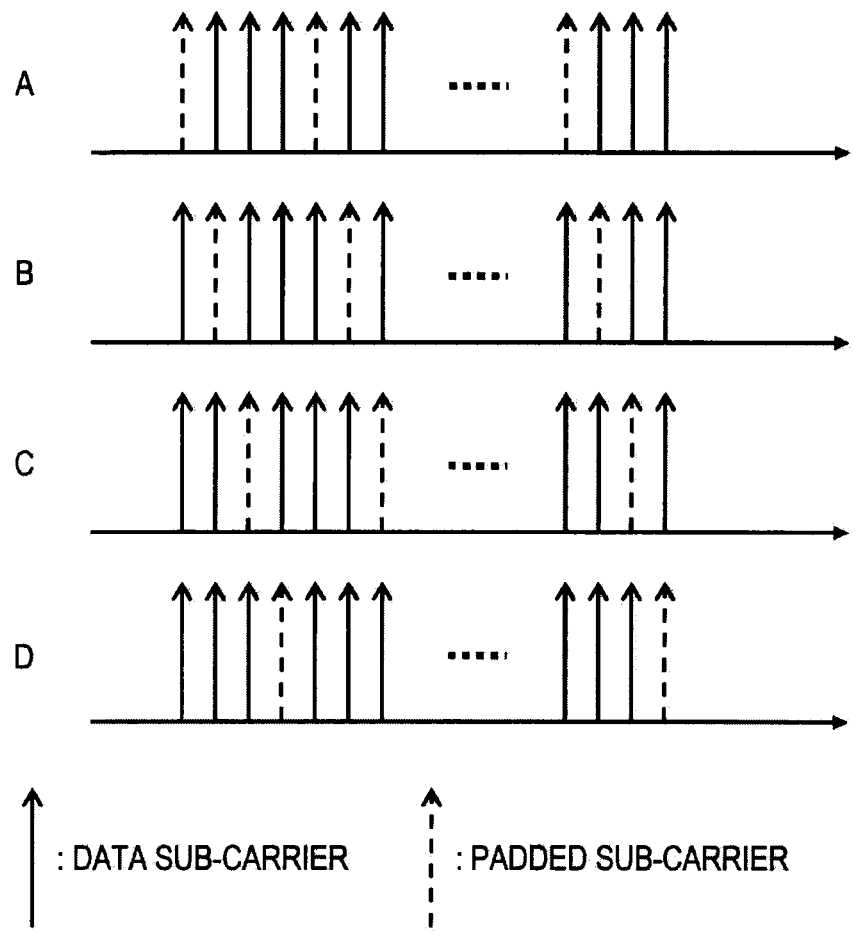
FIG. 7B exemplifies a situation in which the combination of the sub-carriers where the padding is performed is changed by the positions A to B of the orthogonal frequency division multiplexing symbols on which the padding is applied.

FIG. 7 exemplifies at situation in which at combination of padded sub-carriers is changed in accordance with the symbol positions where the padding is carried out. In the same drawing, it is supposed that the orthogonal frequency division multiplexing system is applied, and among the frames addressed to the STA1 and the frame addressed to the STA2 multiplexed on the same time and transmitted (or the frames transmitted from each of the STA1 and the STA2 on the same time to the same destination), the padding is applied on the latter frame to have the same frame length. As illustrated in FIG. 7A, the padding applied in units of symbol on a plurality of positions A, B, C, D, . . . in a data section of the frame addressed to the STA1 (or the frame from the STA2). Then, as illustrated in FIG. 7B, on the basis of the positions A to B in the frame of the orthogonal frequency division multiplexing symbol where the padding is applied, the combination of the padded sub-carriers is changed. In a case where the frequency error estimation, the timing error estimation, and the channel estimation are carried out by using the padded sub-carriers, since the positions of the sub-carriers are dispersed across the entire symbol as illustrated in FIG. 7B, it is possible to improve the estimation accuracy.

Also, in a case where the padding is applied in units of either the bit or the symbol too, some methodologies are conceivable also with regard to the positions where the padding is applied in the frame. FIG. 8 to FIG. 11 illustrate arrangement examples where the padding is applied in the frame. If should be however noted that the eventually transmitted frame is composed of a preamble section, a header section, and a data section, and the padding is applied on the data section. Although no particular limitations are given to the preamble section and the header section, the lengths of these fields are preferably the same between the multiplexed frames. Also, in the respective drawings, for simplicity of the description, a case is supposed in which the padding is applied on one having a shorter frame length when two frames are multiplexed.

Figure 8:
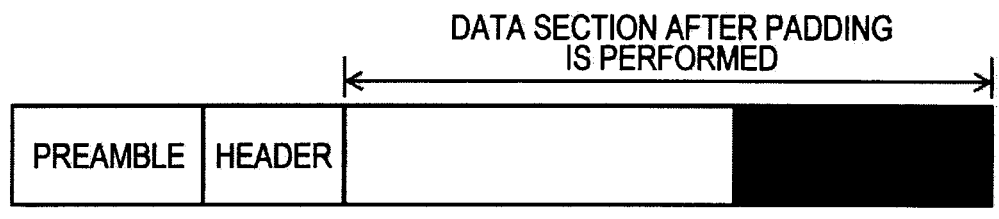
FIG. 8 illustrates an arrangement example in which the padding is applied in the frames, to be more specific, a situation in which padding areas are collectively arranged in a rear of a data section.
Figure 9:
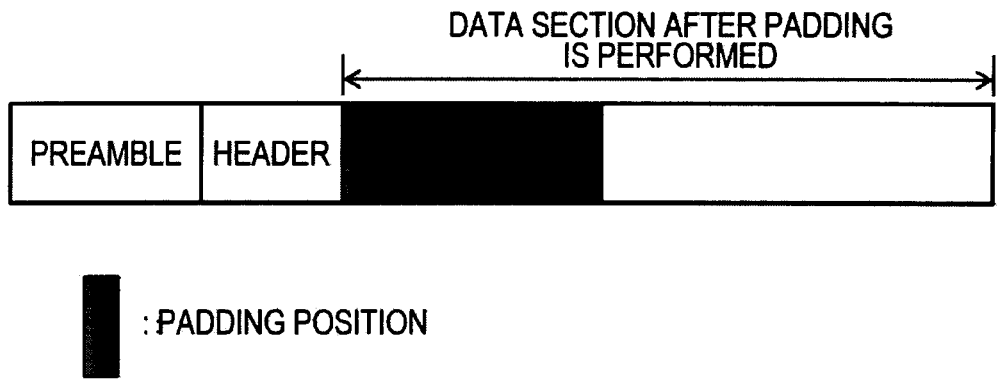
FIG. 9 illustrates an arrangement example in which the padding is applied in the frames, to be more specific, a situation in which the padding areas are collectively arranged in a front of the data section.

In the example illustrated in FIG. 8, padding areas are collectively arranged in a rear of the data section. In contrast to this, in the example illustrated in FIG. 9, padding areas are collectively arranged in a front of the data section. As illustrated in FIG. 9, in a case where the padding is carried out on the known symbol in the front of the frame, by using the relevant symbol as a pilot signal on the reception side of the frame, as compared with the case where the padding is carried out in the rear of the frame as illustrated in FIG. 8, the effect of the reception auxiliary such as the frequency error estimation, the timing error estimation, and the channel estimation utilizing the padding areas is increased.

Figure 10:
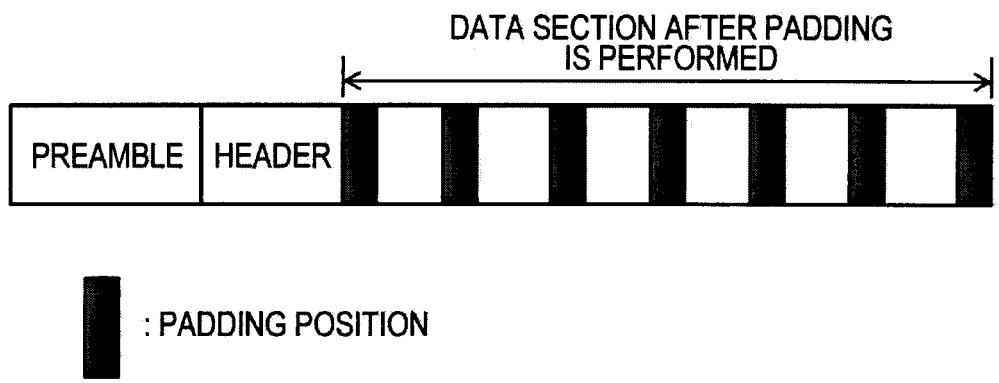
FIG. 10 illustrates an arrangement example in which the padding is applied in the frames, to be more specific, a situation in which the padding areas are finely divided and evenly dispersed and arranged across the entire data section.
Figure 11:
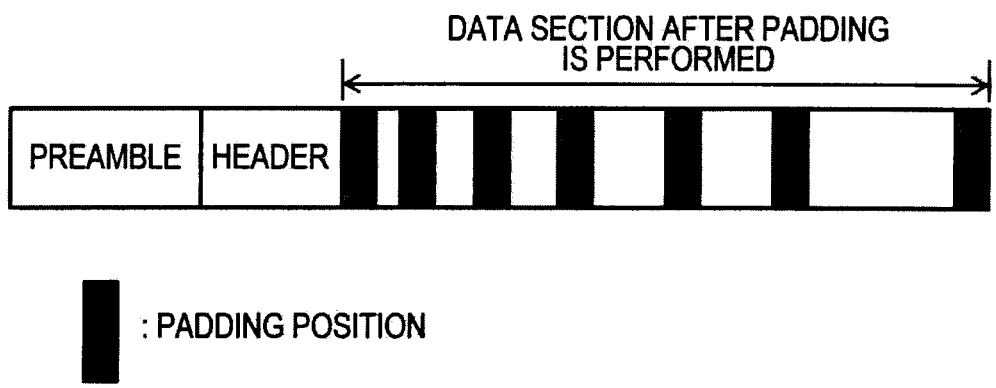
FIG. 11 illustrates an arrangement example in which the padding is applied in the frames, to be more specific, a situation in which the padding areas are finely divided and unevenly dispersed and arranged across the entire data section.

Also, in the examples illustrated in FIG. 10 and FIG. 11, padding areas are finely divided, and the padding areas are dispersed to be arranged across the entire data section.

Among this, in the example illustrated in FIG. 10, the padding areas are evenly dispersed in the data sections to be arranged. By performing the padding on the known symbol in a dispersed manner, the tracking of the frequency error estimation, the timing error estimation, and the channel estimation utilizing the padding areas can be carried out across the frame.

Meanwhile, in the example illustrated in FIG. 11, the padding areas are unevenly dispersed in the data section to be arranged. In this case too, the tracking of the frequency error estimation, the timing error estimation, and the channel estimation can be carried out. Also, by densely arranging the padding areas in the front of the frame when the dispersion is carried out, the effect in the case where the padding is carried out in the front of the data section is obtained as well.

Also, instead of being regularly kept constant, the positions where the padding is carried out in the data section may be changed in each case for each multiplexed frame. In the latter case, the padding may be carried out through a selection sequentially is made among a previously defined finite number of padding position patterns. For example, the padding position patterns illustrated in FIG. 8 to FIG. 11 may be selected in order or randomly. In a case where the selection is made from the finite number of padding position patterns on the transmission side of the multiplexed frames, an advantage exists that a method of notifying the reception side of the frames on which the padding is applied of the padding positions becomes simplified.

On the reception side of the frames on which the padding is applied, since the original data section part is decoded after the padding areas are removed, it is necessary to recognize the positions where the padding is applied in the frame. In a case where the padding position pattern is changed for each frame instead of being constant across the entire system, a notification or information related to the padding position from the transmission side of the frame to the reception side becomes one solution.

As a method of notifying the information related to the padding position, for example, a description of the information related to the padding position in the preamble section or the header section added in the eventually transmitted frame is exemplified.

As illustrated in FIG. 8 and FIG. 9, in a case where the padding is collectively carried out in the front or the rear of the data section, if the transmission side notifies of the length of the frame before the padding and the length of the frame after the padding, it is possible to identify the area on which the padding is applied on the reception side.

Also, in a case where the padding is carried out through the selection among the finite number of padding position patterns, if the transmission side notifies of the information for identifying the used pattern, it is possible to identify the area on which the padding is applied on the side.

Figure 12:
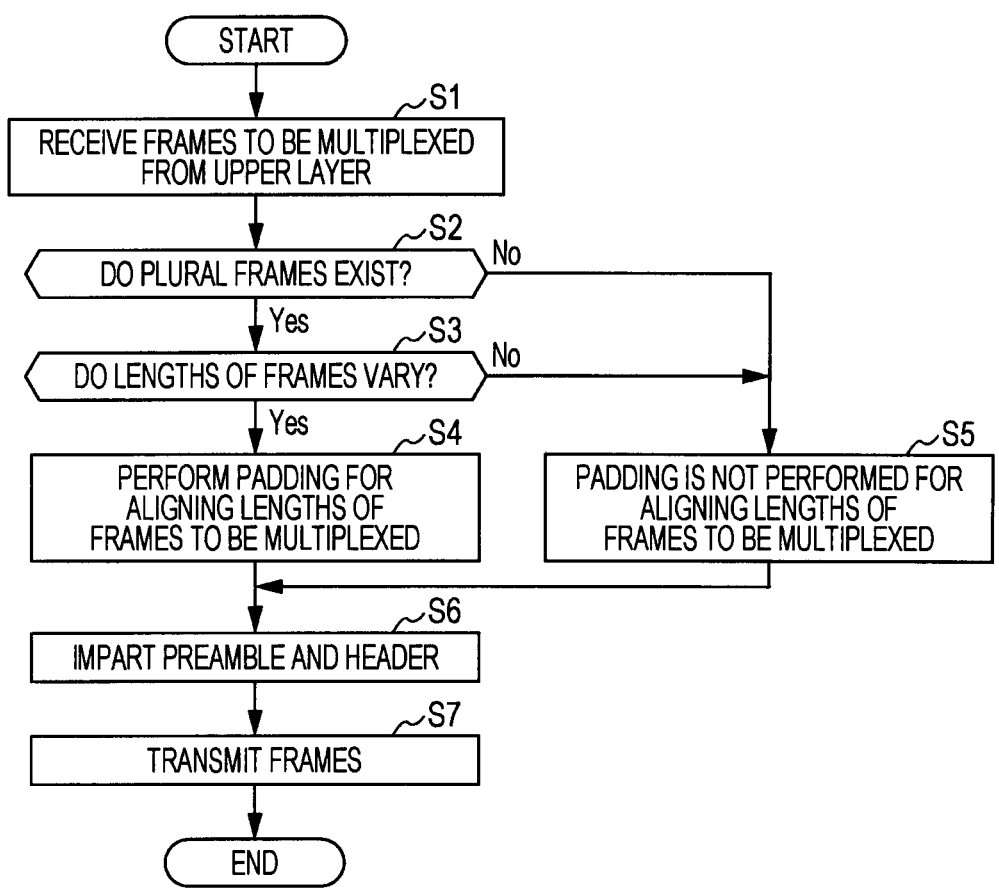
FIG. 12 is a flow chart for illustrating a processing procedure for the communication apparatus illustrated in FIG. 2 to operate as the access point STA0 in the communication sequence illustrated in FIG. 4 and multiplex the respective frames addressed to the plurality to terminal stations STA1 to STA3 on the same time to be transmitted.

FIG. 12 illustrates a processing procedure for operating the communication apparatus illustrated in FIG. 2 so as to operate as the access point STA0 in the communication sequence illustrated in FIG. 4 and multiplexing the respective frames addressed to the plurality of terminal stations STA1 to STA3 on the time to be transmitted in a format of a flow chart.

When the transmission frame is received from the upper layer (step S1, it is checked whether the number of received frames is plural (in other words, whether to be multiplexed on the same time) (step S2), and subsequently, it is checked whether or not the lengths of the frames to be multiplexed vary (step S3).

Herein, in a case where the number of received frames is only one and it is not necessary to multiplex (No in step S2), or in a case where the lengths of the frames to be multiplexed are the same and it is not necessary to adjust the frame lengths (No in step S3), the padding for aligning the lengths between the frames to be multiplexed is not carried out (step S5). It should be however noted that step S5 is not intended to limit the conduction of the padding for other purposes such as alignment of the number of sub-carriers in the orthogonal frequency division multiplexing symbol.

On the other hand, in a case where the number of received frames from the upper layer is plural and also these frame lengths are not the same (Yes in both steps S2 and S3), to adjust the frame lengths for the same lengths of the multiplexed frames, the padding is applied with respect to the frames that have insufficient lengths so that the respective frames have a predetermined frame length (step S4). The padding is, basically, executed with respect to the data section in the frame. Also, as a method for the padding, for example, it is possible to use one of those illustrated in FIG. 8 to FIG. 11, but other methods may also be used.

Subsequently, the preamble section and the header section are imparted to the leading parts or the respective frames after the adjustment of the frame lengths is applied (step S6). The data lengths of the preamble section and the header section of the respective frames are basically set to be the same. Also, in a case where the padding position pattern is changed for each frame, the information related to the padding position may be described in the header section with respect to the frame reception side.

Then, the frame transmission processing is executed (step S7), and the present processing routine is ended. In a case where the number of transmission frames is plural, the respective frames eventually mutually having the same length are multiplexed on the same time to be transmitted.

Figure 13:
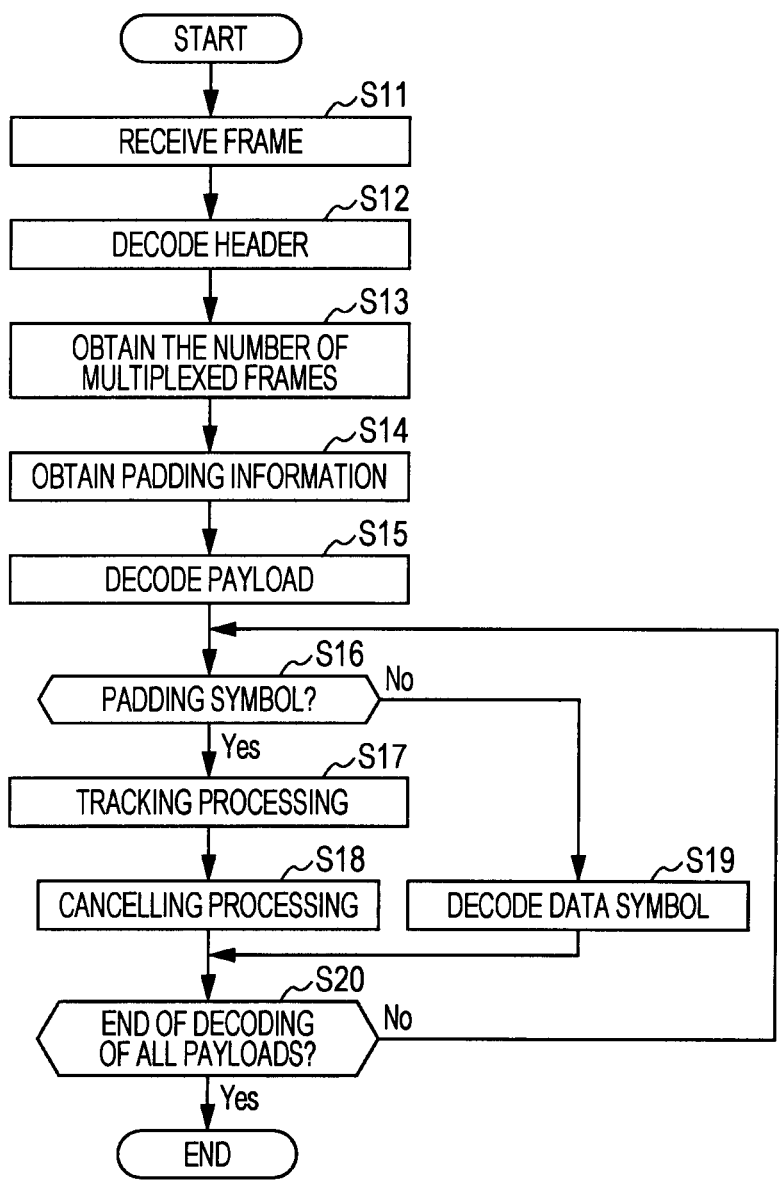
FIG. 13 is a flow chart for illustrating a processing procedure for the communication apparatus illustrated in FIG. 2 to operate as one of the terminal stations STA1 to STA3 in the communication sequence illustrated in FIG. 4 and receive the frames multiplexed on the same time and transmitted by the access point STA0.

FIG. 13 illustrates a processing procedure for causing the communication apparatus illustrated in FIG. 2 to operate as one of the terminal stations STA1 to STA3 in the communication sequence illustrated in FIG. 4 and receiving the frames multiplexed on the same time to be transmitted by the access point STA0.

When the frame is received (step S11), first, the communication apparatus decodes the header section and analyzes a content thereof (step S12). Then, information related to the number of multiplexed frames is obtained (step S13). Also, in a case where the padding position pattern is changed for each frame, information related to the padding position is also obtained from the header section (step S14).

Subsequently, the decoding of the payload section is started (step S15).

When the symbol is not the padding symbol (No in step S16), the decoding processing is executed as the data symbol (step S19).

Also, with regard to the padding symbol (Yes in step S16), the padding symbol is utilized as the pilot symbol, and the tracking of the frequency error estimation, the timing error estimation, and the channel estimation is carried out (step S17), and further, the cancelling is executed (step S18).

Then, when the repeated execration of the above-mentioned processing is ended across all the symbols of the payload section (step S20), the present processing routine is ended.

Figure 14:
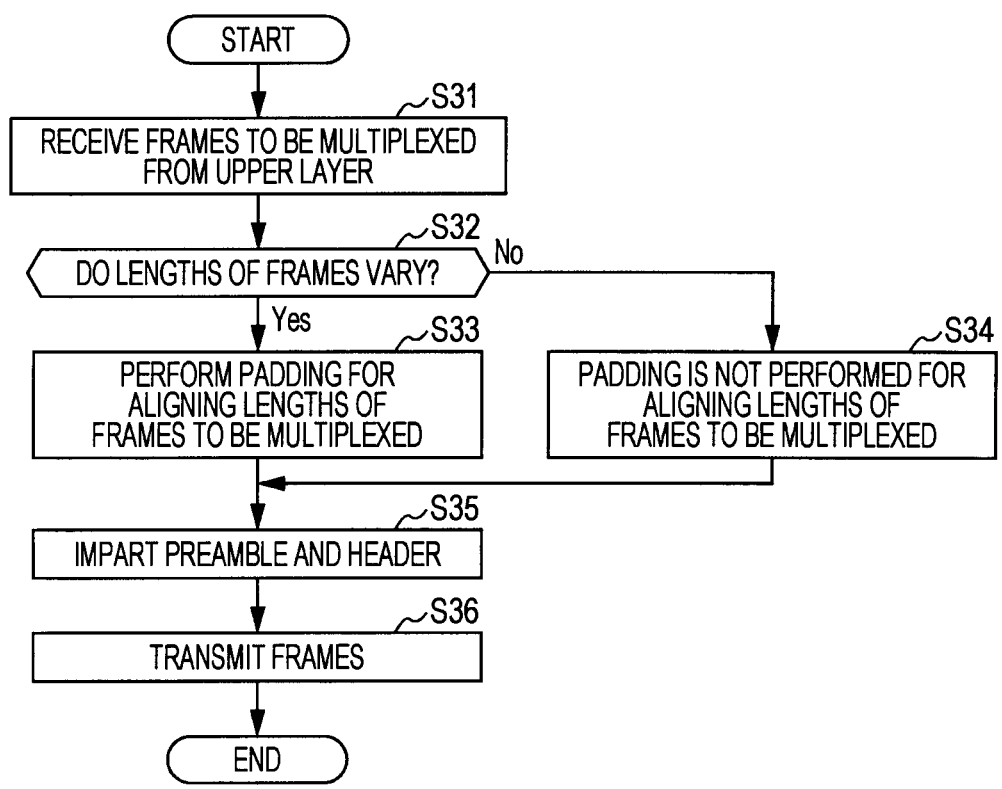
FIG. 14 is a flow chart for illustrating a processing procedure for the communication apparatus illustrated in FIG. 2 to operate as one of the terminal stations STA1 to STA3 in the communication sequence illustrated in FIG. 5 and transmit the respective frames addressed to the access point STA0 on the same time.

FIG. 14 illustrates a processing procedure for causing the communication apparatus illustrated in FIG. 2 to operate as one of the terminal stations STA1 to STA3 in the communication sequence illustrated in FIG. 5 and transmitting the respective frames addressed to the access point STA0 on the same time in a format of a flow chart.

When the frames that should be transmitted on the same time with the other communication apparatus are received from the upper layer (step S31), it is checked whether or not the length of the received frame is shorter than a predetermined frame length (step S32).

Herein, the length of the received frame becomes the predetermined frame length (No in step S32), and the padding for aligning to the predetermined frame length is not carried out (step S34). It should be however noted that step S5 is not intended to limit the conduction of time padding for other purposes such as the alignment of the number of sub-carriers in the orthogonal frequency division multiplexing symbol.

On the other hand, when the length of the received frame is shorter than the predetermined frame length (Yes in step S32), the padding is carried out for aligning to the predetermined frame length (step S33). The padding is, basically, executed with respect to the data section in the frame. Also, as the method for the padding, for example, one of those illustrated in FIG. 8 to FIG. 11 can be by used, but other methods may also be used.

Subsequently, the preamble section end the header section are imported to the leading parts of the frames after the adjustment of the frame lengths is applied (step S35). The data lengths of the preamble section and the header section of the frames are basically set to be the same as the other communication apparatus. Also, in a case where the padding position pattern is changed for each frame, the information related to the padding information may be described in the header section with respect to the frame reception side.

Then, the frame transmission processing is executed on the same time with the other communication apparatus (step S36), and the present processing routine is ended.

It should be noted that the processing, carried out by the access point STA0, of receiving the respective frames transmitted on the same time from the plurality of terminal stations STA1 to STA3 in the communication sequence illustrated in FIG. 5 takes a procedure similar to FIG. 13, and a description will be omitted herein.

In this manner, in the communication system according to the present embodiment, the data frame having the different lengths are multiplexed on the same time through the space division multiple access, but the multiplexed frames are set to eventually have the same length and then transmitted, so that when the multiplexed data frames are received in the respective communication stations STA1 to STA3 from the access point STA0 in FIG. 4 or when the data simultaneously transmitted from the respective communication stations STA1 to STA3 are received in the access point STA0 in FIG. 5, it is possible to eliminate the operation instability of the AGC accompanied by the abrupt change in the reception power.

INDUSTRIAL APPLICABILITY

In the above, the present invention has been described in detail with reference to the specific embodiments. However, in is obvious that those skilled in the art may achieve modifications and alterations of the relevant embodiments without departing from the gist of the present invention.

According to the present specification, the embodiment applied to the new wireless LAN standard such as IEEE802.11ac that is aimed at the realization of the extra-high throughput of 1 Gbps has been mainly described, but the gist of the present invention is not limited to this. For example, the present invention can be similarly applied to other wireless LAN systems where the wireless resource on the spatial axis is shared by the plurality of users and various wireless systems other than the LAN.

Also, the method of aligning the frame lengths eventually output from the PHY layer for each frame transmission time while following the present invention can be similarly applied not only in a case where the plurality of frames are subjected to the space division multiplexing but also in a case where the code division multiplexing, the frequency division multiplexing, or the orthogonal frequency division multiplexing is carried out or a case where two or more among these multiplexing systems are combined.

Also, the application range of the present invention is not limited to the system based on the variable length frame and can be applied to various wireless communication systems where an adjustment on frame lengths is required.

To elaborate, the present invention has been described with reference to exemplary embodiments, and the described content of the present specification should not be construed in a limited manner. To determine the gist of the present invention, the scope of claims should be taken into account.

REFERENCE SIGNS LIST 20-1, 20-2 TRANSMISSION RECEPTION BRANCH
21-1, 21-2 ANTENNA ELEMENT
22-1, 22-2 DUPLEXER
23-1, 23-2 TRANSMISSION PROCESSING UNIT
24-1, 24-2 RECEPTION PROCESSING UNIT
25 DATA PROCESSING UNIT
30 TRANSMISSION RECEPTION BRANCH
31 ANTENNA ELEMENT
32 DUPLEXER
33 TRANSMISSION PROCESSING UNIT
34 RECEPTION PROCESSING UNIT
35 DATA PROCESSING UNIT

The invention claimed is:

1. A communication apparatus comprising:
   circuitry configured to
   receive a plurality of multiplexed frames having adjusted frame lengths, the multiplexed frames having been generated by multiplexing a plurality of frames to form multiple-user MIMO (MU-MIMO), and at least a part of the multiplexed plurality of frames having padding applied thereto in order to have the adjusted frame lengths,
   decode a preamble or a header part of the frames to obtain information related to positions of the padding applied on at least a part of the frames to adjust frame lengths, and
   decode a payload section of the frames after the padding is removed,
   wherein information related to one pattern of a plurality of predetermined padding position patterns is provided in the preamble or the header part of the frames,
   wherein the plurality of predetermined padding position patterns include a first pattern and a second pattern, the first pattern corresponding to padding on an end portion inserted after a data section of each frame, and the second pattern corresponding to padding on one or more intermediate parts of the data section inserted within the data section of each frame, wherein the one or more intermediate parts do not include a head or end of the data section,
   wherein the one pattern is selected from among the plurality of predetermined padding position patterns, and
   wherein padding positions indicated by the plurality of predetermined padding position patterns include a position before bits for error correction.

2. The communication apparatus according to claim 1, wherein the circuitry is further configured to
   decode a header part of the frames to obtain a number of the multiplexed frames.

3. The communication apparatus according to claim 1, wherein the circuitry is further configured to
   determine whether symbols of the payload section are padding symbols.

4. The communication apparatus according to claim 3, wherein, when one symbol of the symbols is determined to be a padding symbol, the circuitry is further configured to
   utilize the padding symbol as a pilot symbol, and
   carry out tracking of a frequency error estimation, a timing error estimation, and a channel estimation.

5. The communication apparatus according to claim 3, wherein, when one symbol of the symbols is determined to not be a padding symbol, the circuitry is further configured to
   decode the payload section as a data symbol.

6. The communication apparatus according to claim 1, wherein the received plurality of multiplexed frames include frames subjected to two or more among a space division multiplexing, a code division multiplexing, a frequency division multiplexing, and an orthogonal frequency division multiplexing.

7. The communication apparatus according to claim 1, wherein, when a bit known between a communication apparatus that is a source of the frame is utilized for the padding, the circuitry is further configured to
   utilize the bit as a pilot symbol; and
   carry out tracking of a frequency error estimation, a timing error estimation, and a channel estimation.

8. The communication apparatus according to claim 1, wherein the padding is collectively removed at the head or the end of the data section of each frame.

9. The communication apparatus according to claim 1, wherein circuitry is further configured to
   receive a notification related to a padding position when a padding position pattern is changed for each frame at a frame transmission side.

10. The communication apparatus according to claim 9, wherein the information related to the padding position is obtained from the header part of the frames.

11. A communication method comprising:
    receiving a plurality of multiplexed frames having adjusted frame lengths, the multiplexed frames having been generated by multiplexing a plurality of frames to form multiple-user MIMO (MU-MIMO), and at least a part of the multiplexed plurality of frames having padding applied thereto in order to have the adjusted frame lengths;
    decoding a preamble or a header part of the frames to obtain information related to positions of the padding applied on at least a part of the frames to adjust frame lengths; and
    decoding a payload section of the frames after the padding is removed,
    wherein information related to one pattern of a plurality of predetermined padding position patterns is provided in the preamble or the header part of the frames,
    wherein the plurality of predetermined padding position patterns include a first pattern and a second pattern, the first pattern corresponding to padding on an end portion inserted after a data section of each frame, and the second pattern corresponding to padding on one or more intermediate parts of the data section inserted within the data section of each frame, wherein the one or more intermediate parts do not include a head or end of the data section,
    wherein the one pattern is selected from among the plurality of predetermined padding position patterns, and
    wherein padding positions indicated by the plurality of predetermined padding position patterns include a position before bits for error correction.

12. The communication method according to claim 11, further comprising:
    decoding a header part of the frames to obtain a number of the multiplexed frames.

13. The communication method according to claim 11, further comprising:
    determining whether symbols of the payload section are padding symbols.

14. The communication method according to claim 13, further comprising:
    when one symbol of the symbols is determined to be a padding symbol, utilizing the padding symbol as a pilot symbol, and carrying out tracking of a frequency error estimation, a timing error estimation, and a channel estimation.

15. The communication method according to claim 13, further comprising:
    when one symbol of the symbols is determined to not be a padding symbol, decoding the payload section as a data symbol.

16. The communication method according to claim 11, wherein the received plurality of multiplexed frames include frames subjected to two or more among a space division multiplexing, a code division multiplexing, a frequency division multiplexing, and an orthogonal frequency division multiplexing.

17. The communication method according to claim 11, further comprising:
when a bit known between a communication apparatus that is a source of the frame is utilized for the padding, utilizing the bit as a pilot symbol, and carrying out tracking of a frequency error estimation, a timing error estimation, and a channel estimation.

18. The communication method according to claim 11, wherein the padding is collectively removed at the head or the end of the data section of each frame.

19. The communication method according to claim 11, further comprising:
receiving a notification related to a padding position when a padding position pattern is changed for each frame at a frame transmission side.

20. The communication method according to claim 19, wherein the information related to the padding position is obtained from the header part of the frames.

21. A non-transitory computer-readable medium having embodied thereon a program, which when executed by a computer causes the computer to execute a method, the method comprising:
receiving a plurality of multiplexed frames having adjusted frame lengths, the multiplexed frames having been generated by multiplexing a plurality of frames to form multiple-user MIMO (MU-MIMO), and at least a part of the multiplexed plurality of frames having padding applied thereto in order to have the adjusted frame lengths;
decoding a preamble or a header part of the frames to obtain information related to positions of the padding applied on at least a part of the frames to adjust frame lengths; and
decoding a payload section of the frames after the padding is removed,
wherein information related to one pattern of a plurality of predetermined padding position patterns is provided in the preamble or the header part of the frames,
wherein the plurality of predetermined padding position patterns include a first pattern and a second pattern, the first pattern corresponding to padding on an end portion inserted after a data section of each frame, and the second pattern corresponding to padding on one or more intermediate parts of the data section inserted within the data section of each frame, wherein the one or more intermediate parts do not include a head or end of the data section,
wherein the one pattern is selected from among the plurality of predetermined padding position patterns, and
wherein padding positions indicated by the plurality of predetermined padding position patterns include a position before bits for error correction.

22. The non-transitory computer-readable medium according to claim 21, wherein the executed method further comprises:
decoding a header part of the frames to obtain a number of the multiplexed frames.

23. The non-transitory computer-readable medium according to claim 21, wherein the executed method further comprises:
determining whether symbols of the payload section are padding symbols.

* * * * *